United States Patent

[11] 3,543,642

[72] Inventor Woodrow Seamone
Rockville, Maryland
[21] Appl. No. 830,213
[22] Filed May 28, 1969
Continuation-in-part of Ser. No. 671,493,
Sept. 28, 1967, abandoned
[45] Patented Dec. 1, 1970
[73] Assignee The United States of America Represented by the Secretary of the Navy. by mesne assignments

[54] UNITIZED CONTROL MODULE FOR A HYDRAULIC ACTUATION APPARATUS
9 Claims, 5 Drawing Figs.
[52] U.S. Cl. .................................................. 91/361,
91/367, 91/413, 91/461; 92/129, 92/151;
137/625.61, 137/625.64
[51] Int. Cl. ..................................................... F15b 13/16,
F15b 13/06; F01b 7/00

[50] Field of Search .......................................... 91/453,
365, 411, 411(A), 367, 361, 363(Cursory),
413(Cursory), 461(Cursory); 137/625.66, 625.64;
92/129(Cursory), 151(Cursory)

[56] References Cited
UNITED STATES PATENTS
| | | | |
|---|---|---|---|
| 2,947,285 | 8/1960 | Baltus et al. .................. | 91/453 |
| 2,950,703 | 8/1960 | Fletcher et al. ............... | 91/453 |
| 2,961,001 | 11/1960 | Pippenger ..................... | 91/453 |
| 3,027,878 | 4/1962 | Keyt et al. ..................... | 91/453 |

Primary Examiner—Paul E. Maslousky
Attorney—Justin P. Dunlavey and John O. Tresansky ABSTRACT: The present invention is an hydraulic control apparatus that may be used in missiles and aircraft for operating a main power actuator, such as a wing actuator. The apparatus is dual, to provide redundancy, and has its own oil supply so that it may operate independently of the main hydraulic system of the missile or aircraft, and may be removed for servicing or replacement without interrupting the hydraulic lines of said main system.

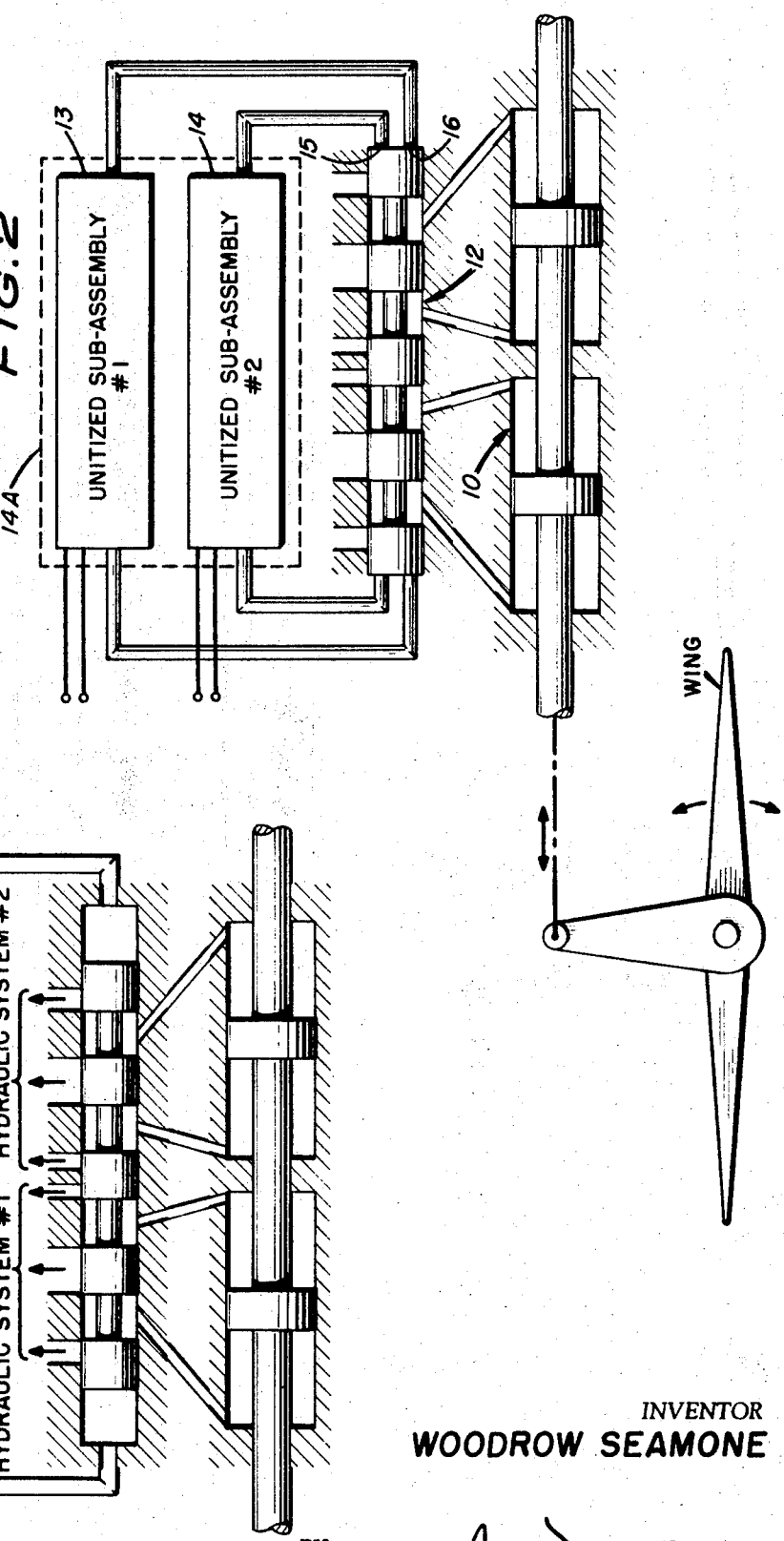

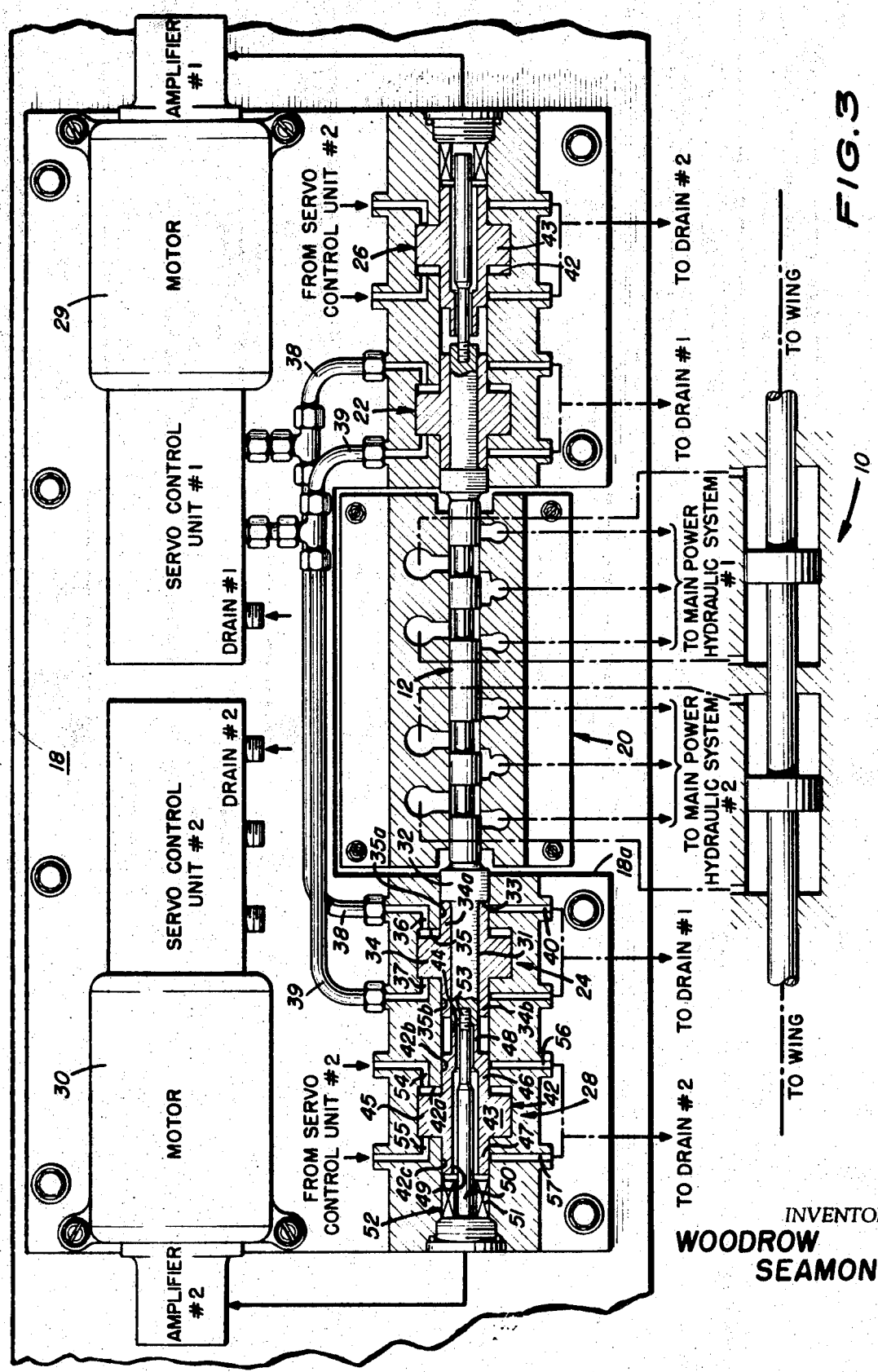

UNITIZED CONTROL MODULE FOR A HYDRAULIC ACTUATION APPARATUS

CROSS REFERENCE TO OTHER APPLICATIONS

This application is a continuation-in-part of U.S. Pat. application No. 671,493, now abandoned, and having been filed Sept. 28, 1967.

DESCRIPTION OF THE INVENTION

The power control requirement and the temperatures associated with high-speed flight indicate the need for a hydraulic system of high capacity and capable of operating at oil temperatures of the order of 400° to 500° F. Safety considerations require double or triple redundancy in components and systems, and in all associated logic and switching functions. The common approach to a redundant system has been to employ two or three first-stage servovalves in parallel for controlling a dual pressure source power spool stage. The output flow is then metered typically into a tandem power actuator arrangement.

Some of the disadvantages of the above-mentioned system are (1) that the condition of the fluid flowing through the servovalve determines the amount of contamination tolerable for the complete hydraulic system, with the result that said system must be very clean to avoid contamination problems; (2) the basic system has many logic elements and hydraulic switching functions to perform correctly in the event of a malfunction; (3) the servovalves are difficult to replace in service without introducing potential contamination problems, and (4) the main hydraulic system may have control stage-power stage-dynamic interactions.

To obviate to a large extent the difficulties mentioned hereinabove, the present invention provides, as one of its more important objects, an hydraulic control apparatus that utilizes a unitized module which has its own hydraulic fluid supply, so that said module may be removed for servicing or replacement without disturbing the lines of the main hydraulic power system.

As another object, the invention contemplates the provision, in an hydraulic control apparatus, of a unitized module which, although operating independently of the main hydraulic system, has mechanical interfaces with the power control spool of said system, with the result that the high response characteristics of the system will be maintained.

The invention provides, as a further object, an hydraulic control apparatus wherein the unitized module is readily detachable and has tandem servodriven actuators to provide the aforementioned mechanical interfaces with the main system power spool.

Other objects of the invention will appear as the description thereof proceeds.

In the drawings:

FIG. 1 is a schematic view showing a typical tandem power actuator arrangement according to the prior art;

FIG. 2 is a schematic view showing a unitized module actuator according to the present invention;

FIG. 3 is a schematic view, more detailed than FIG. 2, showing the unitized module concept associated with a main tandem power cylinder control valve spool;

FIG. 4b is a block diagram showing the logic circuitry related to the operation of the system shown in FIG. 4a.

Figure 4A:
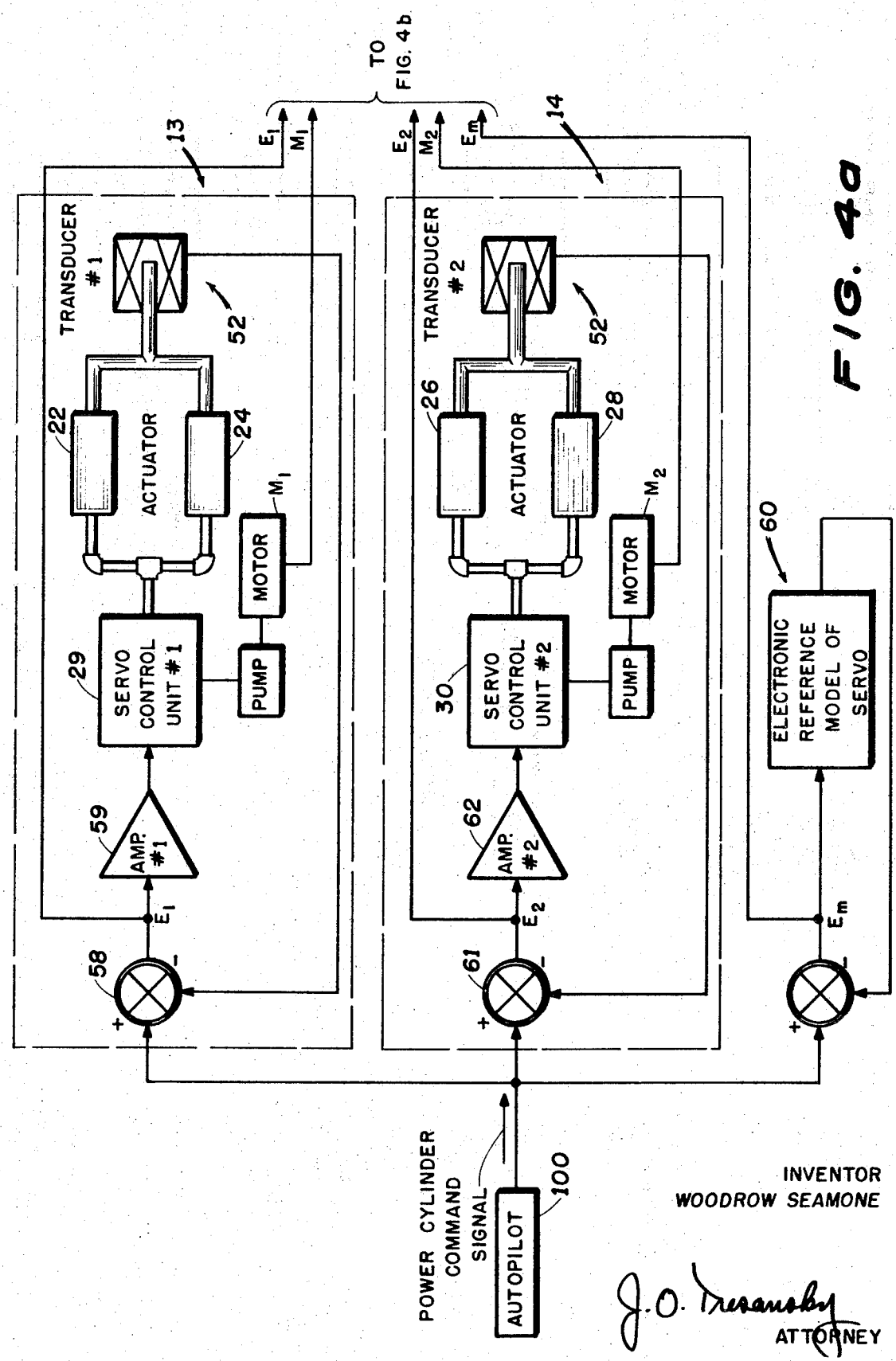
FIG. 4a is a block diagram showing the electrohydraulic system employed with the present invention.

In hydraulic control systems used up to the present time, multiple servovalve first stage units are usually arranged in parallel, with a hydraulic interface between the main high capacity (and usually high temperature) hydraulic system. Such a prior art arrangement is shown in FIG. 1. The arrangement of FIG. 1, however, necessitates a hydraulic power source connection to each first-stage servovalve, and a hydraulic connection with the power spool of the main hydraulic system. Thus, when there is a malfunction in one of the first-stage servovalves, complex switching functions must be provided to shut off flow to the malfunctioning valve and turn on a standby servovalve. A redundancy of associated logic and switching functions is therefore required for each main power spool application.

According to the present invention the power cylinder control valve spool is driven mechanically by the apparatus now to be described. Referring to FIG. 2, a tandem power cylinder is shown at 10 and the power cylinder control valve spool at 12. Shown at 13 and 14 in block form are two unitized submodules contained in a single module assembly or unitized package 14A, either of said submodules for operating the spool 12, the mechanical interfaces between the spool and said submodules being indicated at 15 and 16.

For a clearer understanding of the invention reference is made to FIG. 3. In this view the two submodules of the package 14A (FIG. 2) are mounted on a frame 18 which is shown fitted about a base 20 that supports the control valve spool 12, the frame having a cutout 18a to receive said base. It should be understood that the valve 12 and its base form a part of the main hydraulic system of the aircraft or missile with which the present invention is to be used. Mounted on the frame 18 in axial alinement with the control valve spool at the opposite ends thereof are inner actuators 22 and 24, and positioned in alinement with said actuators 22 and 24, respectively, are outer actuators 26 and 28. The inner actuators 22 and 24 are connected to a servocontrol unit 29, mounted on the frame 18. Similarly, the outer actuators 26 and 28 are connected to a second servocontrol unit 30, also mounted on the frame 18.

In more detail, the inner actuators 22 and 24 are identical. Each comprises a plunger 31 having an enlarged head 32 forming a shoulder 33. The end face of the head 32 engages the confronting end of the spool 12, and said plunger is mounted axially for sliding movement in a piston 34 that is movable in the enlarged central portion of a cylinder 35 in the frame 18.

The cylinder 35 has reduced in diameter end portions 35a and 35b that receive reduced in diameter end portions 34a and 34b, respectively, of the piston 34. Movement of the plunger 31 is limited in one direction by engagement of the shoulder 33 with the outer end of the piston and in the other direction by the end of the spool 12. Ports 36 and 37 are provided in the ends of the cylinder and said ports are connected to the servocontrol valve by fluid lines 38 and 39 respectively. Leakage from the cylinders 35 at each end thereof is conducted back to the servocontrol unit 29 by suitable drains 40, a full showing of the bores connecting said drains with the valve having been omitted from the drawing for purposes of clarity and simplicity.

Referring now to the outer actuators 26 and 28, they, too, are identical. The actuators 26 and 28 each comprise a cylinder 42 in which is mounted for sliding movement a piston 43. The cylinder 42 has an enlarged central portion, indicated at 42a, and reduced in diameter end portions 42b and 42c.

The piston 43 has an enlarged central portion 45 that is slidable in the enlarged central portion 42a of the cylinder 42, and end portions 46 and 47 that are slidable in the reduced in diameter end portions 42b and 42c, respectively. At its inner end the piston 43 terminates in a sleeve 48 which engages the inner end of the plunger 31. Formed in the piston axially thereof is an opening 49 which has a reduced-in-diameter portion 44 near its inner end, and extending throughout the length of the opening and outwardly beyond said opening is an armature 50. The sidewall of the armature is spaced from the wall of the opening so that said armature is freely movable within the piston. The outer end portion of the armature is movable in the coil 51 of a transducer 52. As will be seen, the armature also includes a threaded inner portion 53 that extends beyond the sleeve 48 of the piston 43 and is screwed into the inner end portion of the plunger 31.

To supply hydraulic fluid to the cylinder 42 ports 54 and 55, similar to the ports 36 and 37, are provided at the opposite ends of the enlarged portion 42a of said cylinder, said ports being connected to the servocontrol unit 30 by fluid lines (not fully shown) similar to the fluid lines 38 and 39. Drains 56 and 57 are provided for conducting any leakage from the cylinder 42 back to the servocontrol unit 30, by suitable fluid lines (not fully shown).

The servocontrol units 29 and 30 are of well-known construction and therefore need not be described in detail. Briefly, however, each of said control units includes a motor, a pump, a sump, a pressure regulator valve, a servocontrol valve, and a supply of fluid. Control of the servovalves is effected by electronic means including an amplifier, as will be described hereinafter.

The operation of the above-described unitized actuation apparatus may be accomplished through the use of a number of familiar electromechanical systems. In order to describe the subject invention in an operative environment, a description referenced to FIGS. 4a and 4b is provided hereinafter, which description relates the interfacing between the mechanical structure of the present invention and the electronic system associated therewith.

Figure 4B:
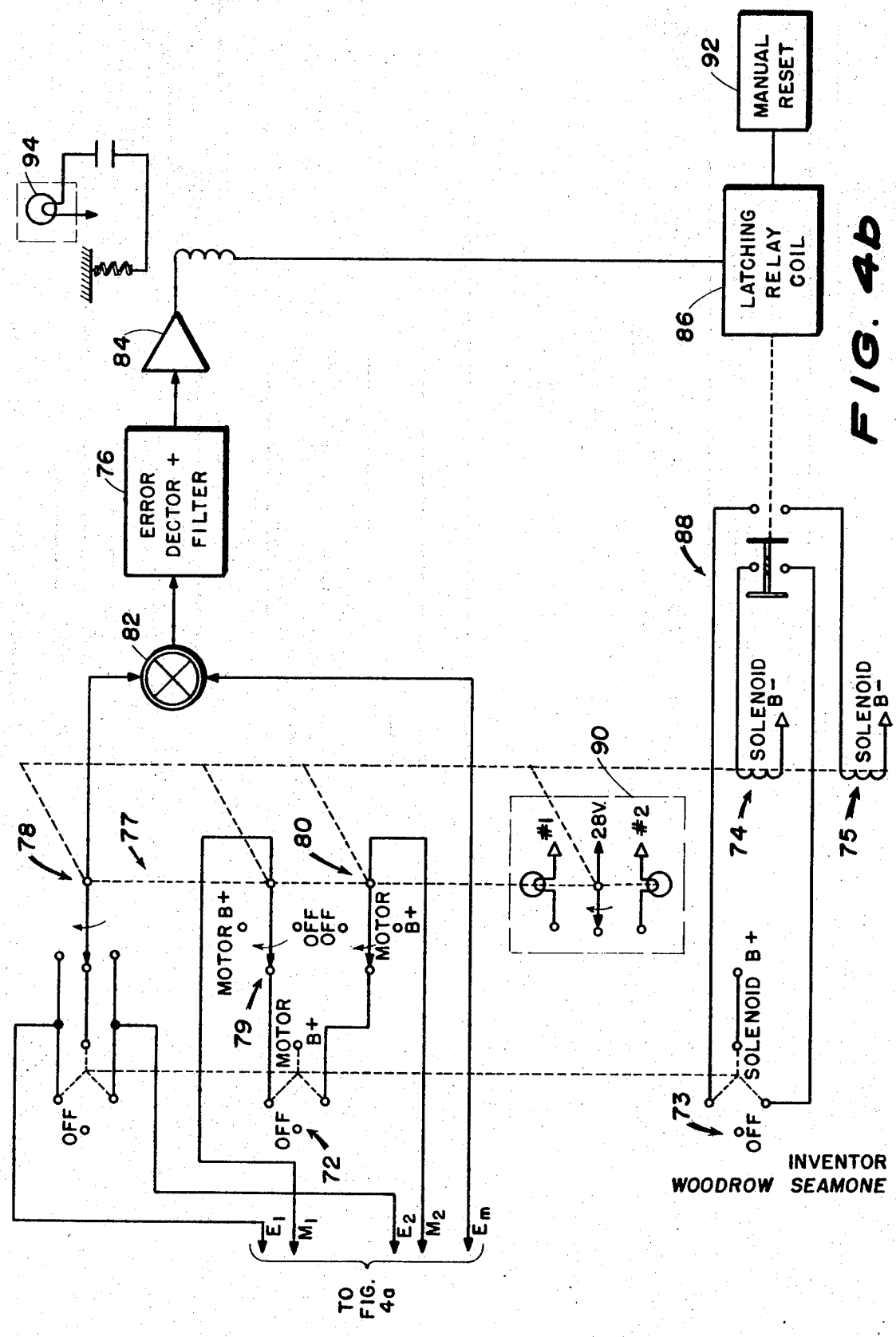

FIGS. 4a and 4b are interrelated block diagrams illustrating the electromechanical arrangement of the subject invention and of a relatively simple electronic system. In the embodiment shown, selection of either unitized subassembly 13 or 14, shown in FIG. 4a, is accomplished by operation of a three-deck switch 70 which may be manually controlled and which is shown in FIG. 4b. The switch 70 controls at 71 the error selection from the subassemblies 13 and 14 and controls at 72 and 73 respectively, the voltage impressed across motors $M_1$ and $M_2$ and failure indicator switching solenoids 74 and 75, to be hereinafter described.

An autopilot 100 simultaneously supplies a continuous power cylinder command signal to the unitized subassemblies 13 and 14 and to an electronic error reference model 60. The autopilot 100 is a familiar device commonly used on missiles or aircraft which would conveniently utilize the present invention. The electronic error reference model 60 includes a comparator, an integrator, suitable amplifiers, and a feedback circuit. The error from this model is compared with the servocontrol unit (29 or 30) in operation in order to detect system malfunctions.

As previously described, manual selection of either subassembly 13 or 14 is accomplished by operation of the switch 70. Assuming that the unitized subassembly 13 is selected to control the power spool 12, the command signal from the autopilot 100 is fed through a comparator 58 and, if there is an error in the position of the control surface operated by the tandem power cylinder 10, to an amplifier 59, as will hereinafter be more fully described. Selection of the subassembly 13 further provides power to a motor $M_1$ which operates the servocontrol unit 29. The error signal $E_1$ for the servocontrol unit 29 is fed to a comparator 82 (FIG. 4b) to be compared with the reference error signal $E_M$ from the electronic error reference model 60. Similarly, if subassembly 14 is manually selected, the command signal is fed through a comparator 61 and subsequently to an amplifier 62. Selection of the subassembly 14 further provides power to a motor $M_2$ which operates the servocontrol unit 30. Error signal $E_2$ is then fed to the comparator 82, the power to the motor $M_1$ of unit 29 being interrupted in this condition.

Referring again to the assumption that subassembly 13 has been selected to control the power spool, and further assuming a malfunction of the servocontrol unit 29, an error voltage will be generated by the comparator 82 as a function of the difference between the voltage created by the error signal $E_1$ and the voltage created by the reference error signal $E_M$, said error signal $E_1$ being fed at 78 through a four deck, three-position solenoid operated switch 77 to the comparator 82. The reference error signal $E_M$ is fed directly to the comparator 82 from the reference model 60. The resultant error signal is amplified and fed to the error detector 76. After appropriate filtering in the detector 76 to minimize the effects of small transient errors, or false alarms, a power amplifier 84 amplifies the generated error voltage to operate a latching relay 86.

When the contacts 73 of the switch 70 are in the positions shown in full lines in FIG. 4b, the solenoid 75 will shift the arms of the switch 77 to positions connecting the error signal ($E_1$) from the amplifier 59 of the subassembly 13 to the error detector 76, power to the motor $M_1$ of the servocontrol unit 29, and power to indicator light No. 1 of an indicator light unit 90. Similarly, when the contacts 73 are in the positions shown in dotted lines in FIG. 4b, the solenoid 74 will shift the arms of the switch 77 to positions connecting the error signal ($E_2$) from the amplifier 62 of the subassembly 14 to the error detector 76, power to the motor $M_2$ of the servocontrol unit 30, and power to indicator light No. 2 of the indicator light unit 90. The lights of the unit 90 function to show which of the subassemblies 13 or 14 is in operation. A failure indicator light 94 is connected to a battery and the contacts of a normally open relay 95, the coil of which is wired in series with the amplifier 84 and the latching relay 86. Failure of the subassembly in use will result in removal of voltage from the coil of the relay 95 and illumination of the light 94.

The latching relay 86 mechanically closes two sets of contacts 88 which allow power to be applied to either of the solenoids 74 or 75, depending upon the position of the contacts 73 of the manually operated switch 70. Energization of either of the solenoids 74 or 75 will operate the switch 77, the solenoid 74 moving the arms of sections 78, 79, 80 and 94 of said switch 77 in one direction and the solenoid 75 moving said arms of said sections in the opposite direction.

If, say, the subassembly 13 should fail, the manually controlled switch 70 may be moved to connect the subassembly 14 in the circuit, and a manual reset 92 may be operated to unlatch the latching relay 86. The failure indicator light 94 would go out if the unit 14 were working properly. In order to recheck the malfunctioning subassembly to verify the failure, the pilot could return the manually controlled switch 70 to the original position and, if the failure mode is still present, it will again be detected.

Normal operation of both subassemblies 13 and 14 may be checked at any time by alternately selecting the subassemblies and noting that the failure light 94 does not become operative for either setting of the switch 70. This technique may also be used to verify the correct repair of a failed subassembly.

Position correction of control surfaces controlled by the tandem power cylinder 10 is accomplished by the servocontrol units 29 and 30 which are operated by the motors $M_1$ and $M_2$ respectively. In the case of the subassembly 13, the motor $M_1$ drives an associated pump which, through the servocontrol unit 29, controls the inner actuators 22 and 24. Movement of the plungers 31 of the actuators 22 and 24 will impart movement to the armatures 50 of the transducers 52 which will develop feedback voltages that are supplied to the comparators 58. Movement of the actuators will also, of course, shift the spool 12 for controlling the main system hydraulic fluid flow into the power cylinder 10 for correcting the position error of the control surface.

From the foregoing description it will be understood that, by providing servocontrol units which operate independently of each other and independently of the main hydraulic system of the aircraft or missile, it will be possible to assure reliable operation of the main tandem power cylinder control valve spool. Moreover, if repairs should be necessary, the entire hydraulic control apparatus may be easily disconnected from the power control valve spool without disturbing the main hydraulic system, since only mechanical interfaces between said spool and the actuators therefor are involved. It should also be apparent from the foregoing description that, although the switch 70 is described for convenience as being manually operated, said switch could be operated by a suitable servounit on signal from a remote source, such as by a ground signal to a missile in flight.

I claim:

1. In combination with an hydraulic control system which includes a tandem power cylinder for connection to a load, a control valve for the tandem power cylinder and having a spool, hydraulic fluid for the tandem power cylinder and for the control valve, a unitized modular hydraulic control apparatus comprising dual actuators disposed at opposite ends of the spool, said actuators each including:
- a plunger engageable with the spool;
- a transducer having a coil and an armature having an end portion movable in the coil, said armature being secured to the plunger;
- a servocontrol unit connected to the actuators, and hydraulic fluid for the actuators and servocontrol unit, said last-mentioned hydraulic fluid being independent of said first-mentioned hydraulic fluid; and
- said plungers and said spool providing a mechanical interface between the tandem power cylinder control valve and the hydraulic control apparatus.

2. Hydraulic control apparatus as recited in claim 1, wherein said actuators each include a cylinder, and a piston slidable in the cylinder and operatively connected with the plunger.

3. The structure recited in claim 1, and further comprising a frame and a base, wherein said servocontrol unit is mounted on the frame, and wherein the frame is detachably connected to the base.

4. In combination with a main control valve having:
- a spool;
- an hydraulic control apparatus comprising a frame;
- a pair of inner actuators on the frame;
- a pair of outer actuators on the frame;
- each of the outer actuators being in alinement with one of the inner actuators and said pairs of actuators being in alinement with each other and with said spool;
- a servocontrol unit connected with said inner actuators;
- a servocontrol unit connected with said outer actuators;
- selection means for selectively operating said first and second-mentioned servocontrol units, selection of said first-mentioned servocontrol unit operating said spool through said inner actuators and selection of said second-mentioned servocontrol unit operating said spool through said outer actuators; and
- means on each of the inner actuators for providing a detachable mechanical interface between said spool and the hydraulic control apparatus.

5. The combination recited in claim 4 wherein said means comprises a plunger on each of the inner actuators and having heads engaging the opposite ends of the spool.

6. The combination recited in claim 5, including additionally transducers mounted on the frame at each end thereof and in alinement with said actuators, each said transducer having a coil on the frame and an armature secured to a plunger and movable in the coil.

7. The combination cited in claim 6:
- wherein said inner actuators each comprise a piston movable in a cylinder and a plunger slidable in the piston and having a head coupling the plunger to the piston for movement in one direction;
- wherein said outer actuators each comprise a piston movable in a cylinder and having an opening therein;
- wherein said armatures extend through said openings; and
- the pistons of said outer actuators being engageable with the pistons of the inner actuators whereby said outer actuators may move said plungers and armatures upon failure of said inner actuators.

8. The combination recited in claim 6, including additionally, electronic means connecting said transducers to said servocontrol units.

9. Hydraulic control apparatus comprising:
- a frame;
- an actuator having a cylinder mounted on one end of the frame and disposed in spaced relation to the opposite end of the frame;
- a second actuator having a cylinder mounted on the frame in spaced relation to and in alinement with the first-mentioned cylinder;
- a piston in each of said cylinders;
- a plunger in each of said pistons;
- each said plunger having a head and said plungers being mounted in opposed spaced relation;
- said plunger heads being detachably engageable with the opposite ends of a control valve spool mounted therebetween;
- a servocontrol unit operatively connected with said cylinders, operation of said servocontrol unit shifting said pistons and plungers for shifting said control valve spool; and
- transducers mounted on the frame at each end thereof and in alinement with said actuators, each said transducer having a coil mounted on the frame and an armature secured to the plunger on that end of the frame and movable in the coil.